W. W. STEINER.
WIRE HANDLING APPARATUS.
APPLICATION FILED AUG. 8, 1911.
1,078,519.
Patented Nov. 11, 1913.
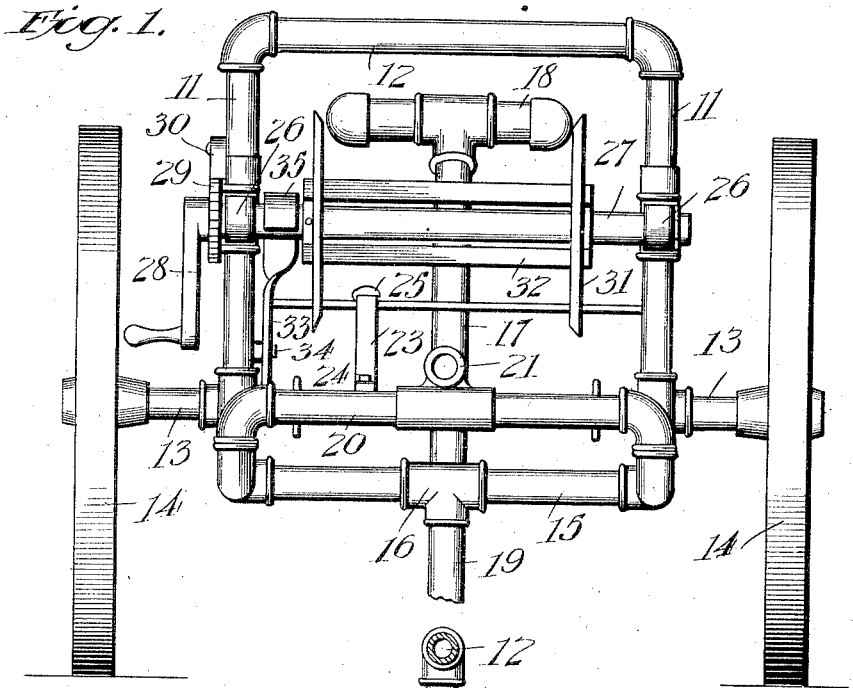
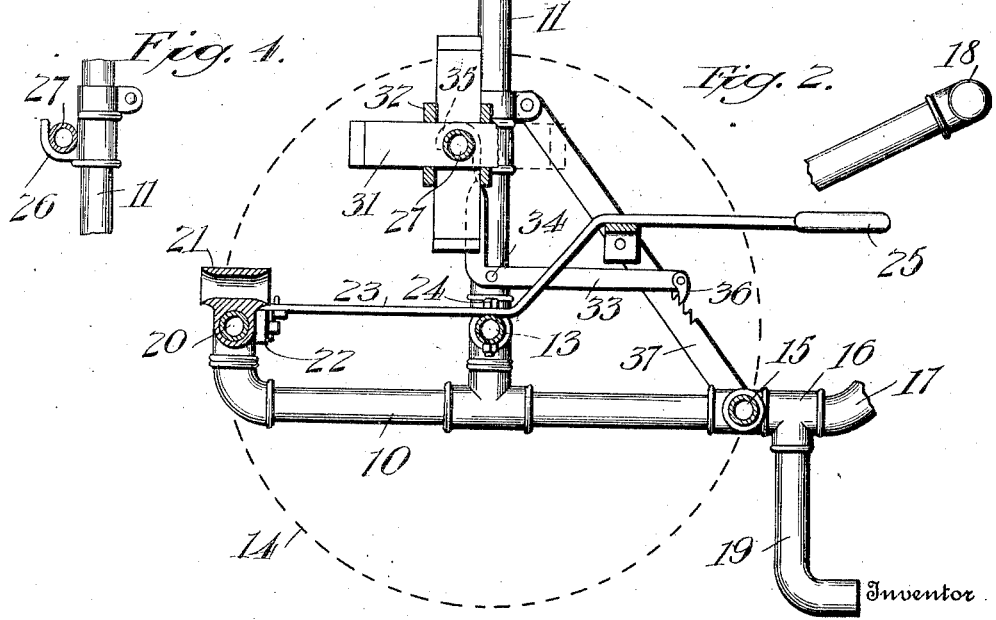
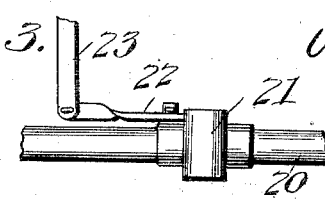
Witnesses
T. L. Mocdane
L. A. Price
Inventor
William W. Steiner,
by C. W. Bradford
Attorney

UNITED STATES PATENT OFFICE.

WILLIAM W. STEINER, OF WELLMAN, IOWA.

WIRE-HANDLING APPARATUS.

1,078,519.  Specification of Letters Patent.  Patented Nov. 11, 1913.

Application filed August 8, 1911. Serial No. 643,019.

*To all whom it may concern:*

Be it known that I, WILLIAM W. STEINER, a citizen of the United States, residing at Wellman, in the county of Washington and State of Iowa, have invented certain new and useful Improvements in Wire-Handling Apparatus, of which the following is a specification.

My said invention consists in certain improvements in the details of construction and arrangement of parts of an apparatus for use in handling wire, especially barbed wire, such as is used for fencing purposes, whereby such an apparatus is provided by which the wire may be conveniently and rapidly reeled up, or paid out, as may be necessary either in building, or taking down such fences, and kept under tension during such operations, all as will be hereinafter more fully described and claimed.

Referring to the accompanying drawings which are made a part hereof and on which similar reference characters indicate similar parts, Figure 1 is a rear elevation of an apparatus of my improved construction carrying a reel such as is commonly used for the purpose described. Fig. 2 a sectional view through the same, and Figs. 3 and 4 detail views.

Said apparatus consists essentially of a truck adapted to support and manipulate the reel and it consists in a frame preferably composed of tubing, or gas pipe, connected by suitable fittings and supported on wheels. The frame consists of longitudinal side bars 10 connected by an arch composed of uprights 11 and a top cross bar 12, all connected by suitable fittings. An axle 13 is mounted in bearings in fittings near the lower end of the uprights 11 and carries wheels 14, which support the truck. The side bars 10 are connected at their front ends by a cross bar 15 carrying a central fitting 16 from the front of which a draft bar 17 extends having a handle 18 on its outer end, and from the underside of which a supporting leg 19 depends, which is adapted to support the frame with the bars 10 in substantially a horizontal position. The rear ends of said bars 10 are connected by a cross bar 20 on which is mounted a sliding guide 21 through which the wire may be threaded for the purpose of guiding the same as it is wound upon, or unwound from, the spool. Said guide 21 has a link 22 pivoted thereto and an operating lever 23 is pivoted to the outer end of said link. Said operating lever 23 is mounted on a pivot 24 on the axle 13 and has a handle 25 extending to a point in front of the apparatus in convenient reach of the operator, whereby said guide may be slid longitudinally on bar 20 to guide the wire for winding upon the reel.

On each of the uprights 11 at a suitable elevation above the axle 13 are mounted open-top bearings 26 to receive the shaft of the wire reel, or spool. Said reel comprises a shaft 27 having a crank 28 on one end and a ratchet-wheel 29 adjacent to said crank with which a pivoted pawl 30 on the adjacent upright 11 is adapted to engage to hold said reel against the strain of the work. The reel itself is preferably composed of end frames 31 in the form of bars extending across each other at right angles and connected by longitudinal bars 32 which may be nailed, or otherwise secured thereto. The end pieces 31 are perforated at the center to slip over shaft 27 and a transverse pin *p* extending through said parts and said shaft may be utilized for securing the reel proper to turn with its shaft.

In order to prevent the reel from unwinding too freely when the wire is being paid out therefrom, I provide a brake consisting of an angle bar 33 mounted on a pivot 34 on one of the uprights and having a hook-shaped brake shoe 35 on its upper end adapted to hook over the reel shaft 27. The other end of said angle lever extends forward and is provided with a pawl 36 on its outer end which is adapted to engage with the serrated edge of a bar 37, which extends between the upright 11 and the forward end of the horizontal bar 10. By this means, as will be seen, by lifting the outer end of the horizontal part of lever 33 the hook-shaped shoe 35 will be drawn with greater or less force upon the surface of shaft 27 and, as said shoe 35 is formed of considerable width, it acts as a brake and prevents said shaft from turning except under some force. The degree of frictional retard is regulated by the adjustment of the forward end of lever 33, as will be readily understood.

In operation, the wire is attached to the central longitudinal bars of the reel frame and wound thereon by turning said reel through the crank 28, the operator sliding guide 21 back and forth on the bar 20 as may be required to secure a uniform winding. After the reel is filled it may be lifted bodily out of the open top bearings 26, the securing pin *p* removed and the reel frame slid from the shaft and another reel put in place on said shaft, which is again put in position in the bearings 26 of the frame and the operation continued. By this method any number of reels, or spools, may be filled with wire ready for transportation. In a like manner, reel after reel may be put in place on the machine and the wire conveniently paid out alongside the fence posts where it is being used for fencing, and the wire itself be paid out under the tension desired through the medium of the brake comprising the lever 22 with its brake-shoe 35, as before described. By this means an apparatus is provided which enables the fence wire, and especially barbed wire, to be handled conveniently and readily and with the least possible requirement for handling it with the hands.

Having thus fully described my said invention, what I claim as new and desire to secure by Letters Patent, is:

1. An apparatus for handling barbed wire comprising a truck, bearings mounted on said truck, a reel shaft mounted in said bearings, a reel on said shaft, means for operating said shaft, a pivoted angle brake bar carrying a brake shoe on one end engaging the reel shaft, and a pawl on its other end, and a notched bar with which said pawl is adapted to engage for holding said brake in the desired adjustment, substantially as set forth.

2. An apparatus for handling wire comprising a frame made of pipe and consisting of longitudinally extending side bars, transversely extending horizontal end bars, centrally located uprights, a transverse top bar connecting said uprights, suitable fittings connecting said several parts, an axle extending through fittings on said uprights, wheels on said axle, a central fitting on the front horizontal bar, a handle extending forward from said central fitting, a supporting leg extending down from said central fitting, a sliding guide on the rear horizontal bar, a lever connected to said sliding guide through a pivoted link, open-top bearings mounted on said uprights, a reel shaft in said bearings, a reel on said shaft, a crank on said shaft, a ratchet and pawl for holding said shaft against the strain of the work, and means for holding said shaft under a frictional brake, substantially as set forth.

In witness whereof, I have hereunto set my hand and seal at Wellman, Iowa, this 3rd day of August, A. D. nineteen hundred and eleven.

WILLIAM W. STEINER. [L. S.]

Witnesses:
EARDLEY BELL, Jr.,
M. C. STRUBLE.

---

Copies of this patent may be obtained for five cents each, by addressing the "Commissioner of Patents, Washington, D. C."